United States Patent
Yang (10) Patent No.: US 9,293,947 B2
(45) Date of Patent: Mar. 22, 2016

(54) LIGHTING DEVICE HAVING UNINTERRUPTIBLE ILLUMINATION AND EXTERNAL POWER SUPPLY FUNCTION

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 590 days.

(21) Appl. No.: 13/647,563

(22) Filed: Oct. 9, 2012

(65) Prior Publication Data
US 2014/0097692 A1 Apr. 10, 2014

(51) Int. Cl.
*H02J 9/06* (2006.01)

(52) U.S. Cl.
CPC .......... *H02J 9/061* (2013.01); *Y02B 10/72* (2013.01); *Y10T 307/625* (2015.04)

(58) Field of Classification Search
CPC .................................. H02J 9/061; Y02B 10/72
USPC ............................................................ 307/66
See application file for complete search history.

(56) References Cited

U.S. PATENT DOCUMENTS

| | | | | |
|---|---|---|---|---|
| 6,483,470 | B1 * | 11/2002 | Hohnstein et al. | 343/721 |
| 2011/0291565 | A1 * | 12/2011 | Hysell et al. | 315/86 |

* cited by examiner

*Primary Examiner* — Rexford Barnie
*Assistant Examiner* — Daniel Kessie
(74) *Attorney, Agent, or Firm* — Bacon & Thomas, PLLC (57) ABSTRACT

The present invention provides a lighting device having uninterruptible illumination and external power supply function, in which the lighting device is combined with an energy storing/discharging device thereby providing an uninterruptible illumination function and supplying uninterruptable AC or DC power to the exterior during power blackout, a controller assembly is integrated with an operation device, an external power supply interface device, an electric-driven lighting device, a public power and/or solar power and/or wind power generation source, and an energy storing/discharging device, thereby capable of providing the uninterruptible illumination function and supplying uninterruptable AC or DC power to the exterior during power blackout.

8 Claims, 5 Drawing Sheets

LIGHTING DEVICE HAVING UNINTERRUPTIBLE ILLUMINATION AND EXTERNAL POWER SUPPLY FUNCTION

BACKGROUND OF THE INVENTION (a) Field of the Invention

The present invention provides a lighting device having uninterruptible illumination and external power supply function, in which the lighting device is combined with an energy storing/discharging device thereby providing an uninterruptible illumination function and supplying uninterruptable AC or DC power to the exterior during power blackout, a controller assembly is integrated with an operation device, an external power supply interface device, an electric-driven lighting device, a public power and/or solar power and/or wind power generation source, and an energy storing/discharging device, thereby capable of providing the uninterruptible illumination function and supplying uninterruptable AC or DC power to the exterior during power blackout, thus the battery of an electric-driven carrier or the actuation battery of an engine carrier or the rechargeable battery of a portable electric device such as a mobile phone, camera, laptop or a rechargeable electric tool can be provided with electric power as the electric source for charging.

(b) Description of the Prior Art

A conventional electric charging device having an energy storing/discharging device for outputting electric power to the exterior is often installed on a roadside or public space or indoor space, a lighting device is often installed on a roadside or public space or indoor space as well, a conflict is often generated for the installation space for the above two; moreover, the street lamp or signal lamp, e.g. traffic signal lamp, of the public illumination at important location is usually required a power uninterruptible function, so an energy storing/discharging device and a charging control circuit shall be installed, what shall be addressed is that main components adopted in the above two are very much the same thereby cost being increased.

SUMMARY OF THE INVENTION

A conventional electric charging device having an energy storing/discharging device for outputting electric power to the exterior is often installed on a roadside or public space or indoor space, a lighting device is often installed on a roadside or public space or indoor space as well, a conflict is often generated for the installation space for the above two; moreover, the street lamp or signal lamp, e.g. traffic signal lamp, of the public illumination at important location is usually required a power uninterruptible function, so an energy storing/discharging device and a charging control circuit shall be installed, what shall be addressed is that main components adopted in the above two are very much the same thereby cost being increased;

The present invention provides a lighting device having uninterruptible illumination and external power supply function, in which the lighting device is combined with an energy storing/discharging device thereby providing an uninterruptible illumination function and supplying uninterruptable AC or DC power to the exterior during power blackout, a controller assembly is integrated with an operation device, an external power supply interface device, an electric-driven lighting device, a public power and/or solar power and/or wind power generation source, and an energy storing/discharging device, thereby capable of providing the uninterruptible illumination function and supplying uninterruptable AC or DC power to the exterior during power blackout, thus the battery of an electric-driven carrier or the actuation battery of an engine carrier or the rechargeable battery of a portable electric device such as a mobile phone, camera, laptop or a rechargeable electric tool can be provided with electric power as the electric source for charging.

DESCRIPTION OF MAIN COMPONENT SYMBOLS

PS100: power source
OP100: operation device
ECU100: electric control unit
ESD100: energy storing/discharging device
C100: external energy supply interface device
OPC100: power output control circuit device
L100: electric-driven lightening device
101: charging grid protection cover
102: ventilation heat dissipating hole
103: cover lock 201: street lamp device
401: public lighting device
601: moveable lighting device
701: black illumination device
801: uninterruptable wall-hanged lighting
901: radially-arranged power supply case
1001: transversally-arranged power supply case
1000: controller assembly

DETAILED DESCRIPTION OF THE PREFERRED EMBODIMENTS

A conventional electric charging device having an energy storing/discharging device for outputting electric power to the exterior is often installed on a roadside or public space or indoor space, a lighting device is often installed on a roadside or public space or indoor space as well, a conflict is often generated for the installation space for the above two; moreover, the street lamp or signal lamp, e.g. traffic signal lamp, of the public illumination at important location is usually required a power uninterruptible function, so an energy storing/discharging device and a charging control circuit shall be installed, what shall be addressed is that main components adopted in the above two are very much the same thereby cost being increased;

The present invention provides a lighting device having uninterruptible illumination and external power supply function, in which the lighting device is combined with an energy storing/discharging device thereby providing an uninterruptible illumination function and supplying uninterruptable AC or DC power to the exterior during power blackout, a controller assembly is integrated with an operation device, an external power supply interface device, an electric-driven lighting device, a public power and/or solar power and/or wind power generation source, and an energy storing/discharging device, thereby capable of providing the uninterruptible illumination function and supplying uninterruptable AC or DC power to the exterior during power blackout, thus the battery of an electric-driven carrier or the actuation battery of an engine carrier or the rechargeable battery of a portable electric device such as a mobile phone, camera, laptop or a rechargeable electric tool can be provided with electric power as the electric source for charging.

Figure 1:
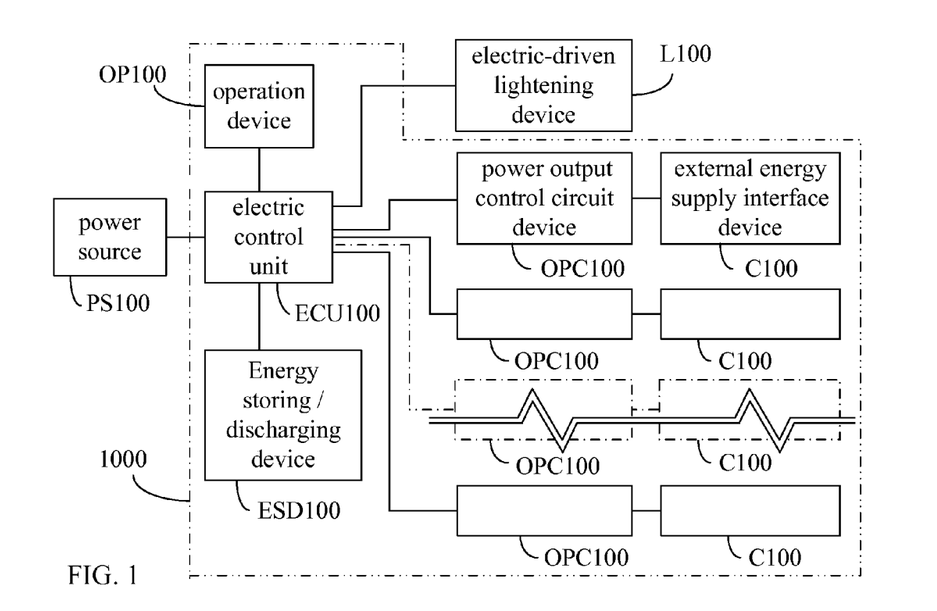
FIG. 1 is a schematic view showing the main circuit of the lighting device having uninterruptible illumination and external power supply function provided by the present invention.

According to the present invention, the lighting device having uninterruptible illumination and external power supply function is disclosed as following:

FIG. 1 is a schematic view showing the main circuit of the lighting device having uninterruptible illumination and external power supply function provided by the present invention;

As shown in FIG. 1, the electric power supplied by a power source (PS100) of public power and/or solar power and/or wind power generation is outputted to a controller assembly (1000), then the controller assembly (1000) is controlled by an operation device (OP100) and/or an electric control unit (ECU100) and/or a power output control circuit device (OPC100) for outputting the AC or DC power through an external power supply interface device (C100) to the exterior, and/or outputting to an electric-driven lighting device (L100), wherein the controller assembly (1000) is served to be inputted with AC, or DC, or AC converting to DC, or DC converting to AC power source (PS100) for outputting power to the electric control unit (ECU100), so as to charge the energy storing/discharging device (ESD100) and/or to supply power to the electric-driven lighting device (L100) and/or to output AC or DC power to the exterior through the power output control circuit device (OPC100) and the external power supply interface device (C100), which mainly consists of:

operation device (OP100): constituted by manually-operated electromechanical switches or buttons or press keys or touch-controlled or voice-controlled interface, and/or an operation switch and/or a user identification device and/or command identification device, the function provided including for actuating the system to operate and/or being installed with an environmental illumination control device for indentifying day/night environmental illumination, and/or being provided with a power source detecting device of public power and/or solar power and/or wind power generation for detecting whether the supply of public power and/or solar power and/or wind power generation being normal or malfunction, so a power supply function of the energy storing/discharging device (ESD100) is actuated, or received with the signal or command of identifying detection power for controlling the electric control unit (ECU100);

energy storing/discharging device (ESD100): constituted by a rechargeable energy storing device including a secondary battery capable of charging and discharging or super capacitor or capacitor, controlled by the electric control unit (ECU100) for controlling the electric power from the power source (PS100) used for charging the energy storing/discharging device (ESD100) through the electric control unit (ECU100), and controlled by the electric control unit (ECU100) for controlling the electric power from the energy storing/discharging device (ESD100) for supplying power to the electric-driven lighting device (L100) and/or supplying power to the exterior through the power output control circuit device (OPC100) and the external power supply interface device (C100);

electric control unit (ECU100): constituted by electromechanical components or solid electric circuit components or chips and relative software, served for receiving the input power from the power source (PS100) and controlled by the operation device (OP100), including one or more than one operational functions: (1) controlling the ON/OFF timing of the power supplied by the power source (PS100) for driving the electric-driven lighting device (L100); or (2) controlling the timing of charging the energy storing/discharging device (ESD100) or terminating the charging when being saturated; or (3) through the energy storing/discharging device (ESD100) outputting electric power, receiving the detection signal of the operation device (OP100) and controlled by the electric control unit (ECU100) for controlling supplying or terminating power to the power-driven lighting device (L100); or (4) controlled by the power output control circuit device (OPC100) to supply AC power of public power and/or solar power and/or wind power generation or AC power with the voltage being regulated to the exterior through the external energy supply interface device (C100); or (5) through the setting of the electric control unit (ECU100) or controlled by the power output control circuit device (OPC100), converting the DC power of the energy storing/discharging (ESD100) into AC output power; or (6) directly outputting the DC power of the energy storing/discharging device (ESD100) or outputting after through the control of the power output control circuit device (OPC100);

electric-driven lighting device (L100): constituted by an electric-driven lamp, including generating lights for illumination or for indication signal lighting, when the power source (PS100) is terminated, the electric power of the energy storing/discharging device (ESD100)

replaces the electric power of the power source (PS100), the electric-driven lighting device (L100) is continued to operation according to the set operating state of the operation device (OP100) and the electric control unit (ECU100), and subsequently controlled by the operation device (OP100) and operated by the set function through the electric control unit (ECU100); when the power source (PS100) is recovered for supplying electric power, the electric power of the power source (PS100) replaces the electric power of the energy storing/discharging device (ESD100), the electric-driven lighting device (L100) is operated according to the set operating state of the operation device (OP100) and the electric control unit (ECU100), and subsequently controlled by the operation device (OP100) and operated by the set function through the electric control unit (ECU100);

external power supply interface device (C100): constituted by a plug or socket structure and a voltage and current controlling and protective device, inputted with the DC or AC power from the electric control unit (ECU100) through the power output control circuit device (OPC100) for outputting to the exterior;

power output control circuit device (OPC100): constituted by electromechanical components or electric circuit components, and/or a fuse or break protection device and/or electric power measuring device and/or installed with a monitoring device for outputted voltage and current, and/or installed with a wired or wireless detecting and monitoring device for the operation state at load end;

The individual units by which the controller assembly (1000) is composed can be individually installed or partially or all co-structured.

Figure 2:
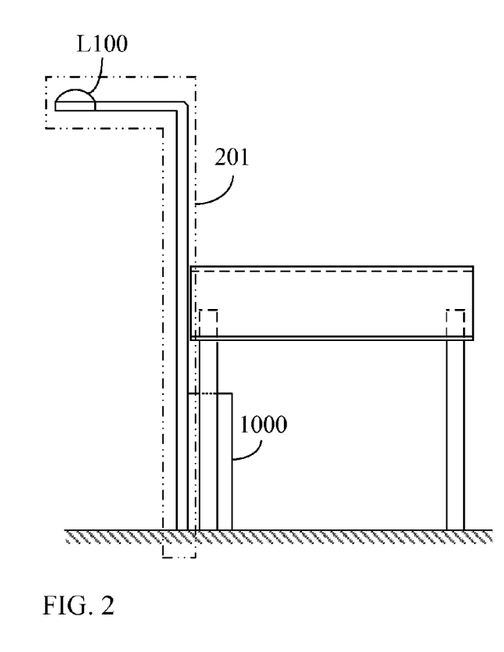
FIG. 2 is a front view illustrating the lighting device having uninterruptible illumination and external power supply function being applied on a street lamp device (201), according to one embodiment of the present invention.
Figure 3:
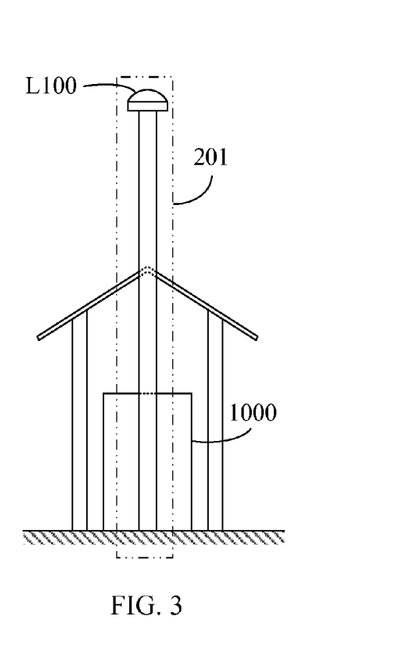
FIG. 3 is a side view illustrating the lighting device having uninterruptible illumination and external power supply function being applied on the street lamp device (201), according to one embodiment of the present invention.

FIG. 2 is a front view illustrating the lighting device having uninterruptible illumination and external power supply function being applied on a street lamp device (201), according to one embodiment of the present invention;

FIG. 3 is a side view illustrating the lighting device having uninterruptible illumination and external power supply function being applied on the street lamp device (201), according to one embodiment of the present invention;

As shown in FIG. 2 and FIG. 3, the main configuration is that the power of the power source (PS100) outputs to the controller assembly (1000), then outputs AC and/or DC power to the external, and/or outputs to the electric-driven lighting device (L100) which composes the street lamp device (201);

wherein: the street lamp device (201) which is uninterruptable during electric blackout and composed by the electric-driven lighting device (L100) includes illumination lamp or signal lamp such as traffic lamp, pedestrian signal lamp, railroad-crossing signal lamp, and meanwhile provides AC and/or DC power which is uninterruptable during power blackout to the external.

Figure 4:
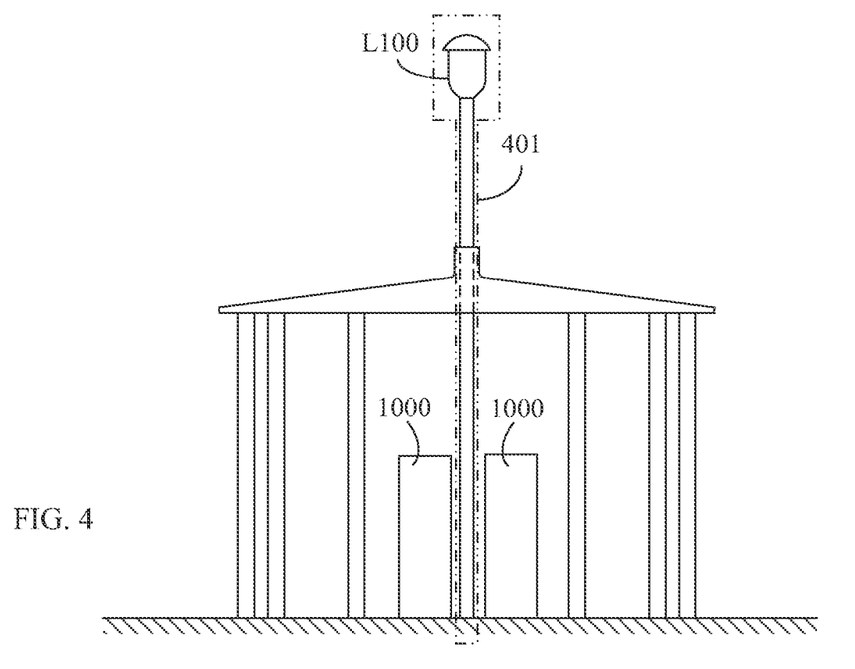
FIG. 4 is a front view illustrating the lighting device having uninterruptible illumination and external power supply function being applied on a floor-type public lighting device (401) at outdoor location, according to one embodiment of the present invention.
Figure 5:
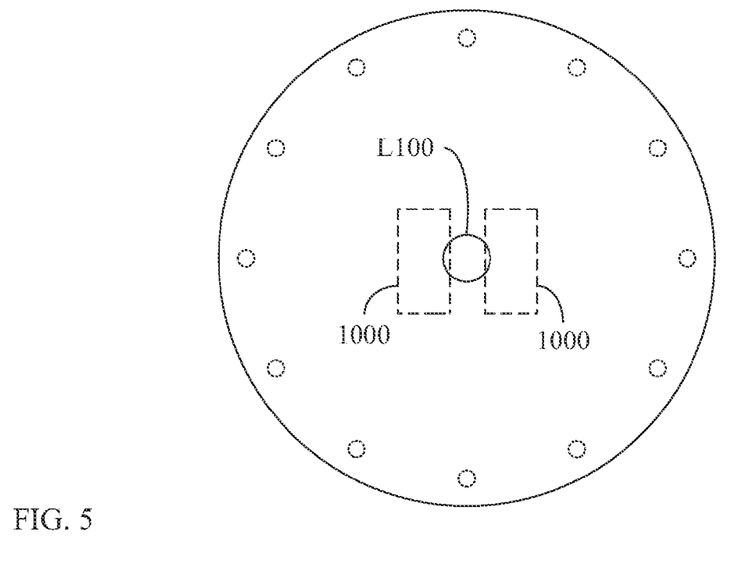
FIG. 5 is a side view illustrating the lighting device having uninterruptible illumination and external power supply function being applied on the floor-type public lighting device (401) at outdoor location, according to one embodiment of the present invention.

FIG. 4 is a front view illustrating the lighting device having uninterruptible illumination and external power supply function being applied on a floor-type public lighting device (401) at outdoor location, according to one embodiment of the present invention;

FIG. 5 is a side view illustrating the lighting device having uninterruptible illumination and external power supply function being applied on the floor-type public lighting device (401) at outdoor location, according to one embodiment of the present invention;

As shown in FIG. 4 and FIG. 5, the main configuration is that the power of the power source (PS100) outputs to the controller assembly (1000), then outputs AC and/or DC power to the external, and/or outputs to the electric-driven lighting device (L100);

wherein: the public lighting device (401) which is uninterruptable during electric blackout and composed by the electric-driven lighting device (L100) includes illumination lighting or high-altitude warning lamp, and meanwhile provides AC and/or DC power which is uninterruptable during power blackout to the external.

Figure 6:
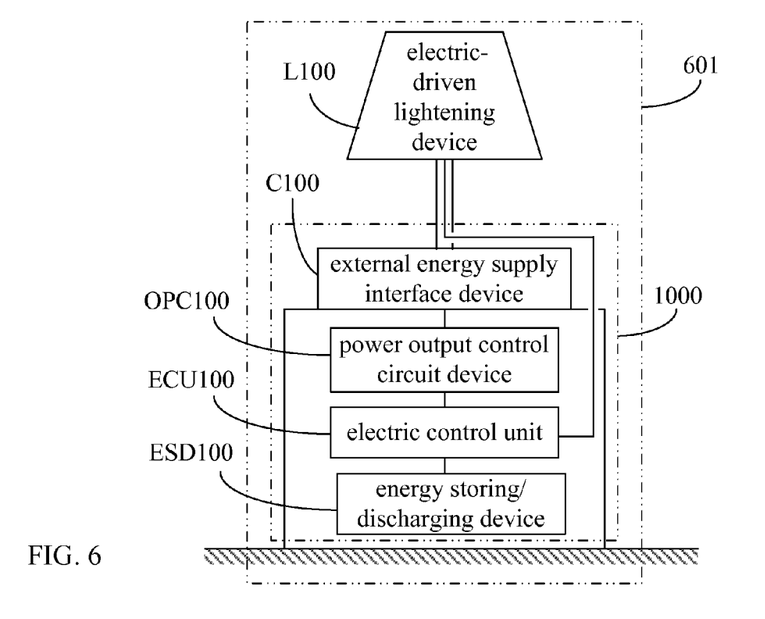
FIG. 6 is a schematic view illustrating the lighting device having uninterruptible illumination and external power supply function being applied in an indoor moveable lighting device (601), according to one embodiment of the present invention.

FIG. 6 is a schematic view illustrating the lighting device having uninterruptible illumination and external power supply function being applied in an indoor moveable lighting device (601), according to one embodiment of the present invention;

As shown in FIG. 6, the main configuration is that the power of the power source (PS100) outputs to the controller assembly (1000), then outputs AC and/or DC power to the external, and/or outputs to the electric-driven lighting device (L100);

wherein: the moveable lighting device (601) which is uninterruptable during electric blackout and composed by the electric-driven lighting device (L100) includes a moveable illumination function applied in indoor or outdoor, and meanwhile provides AC and/or DC power which is uninterruptable during power blackout to the external.

Figure 7:
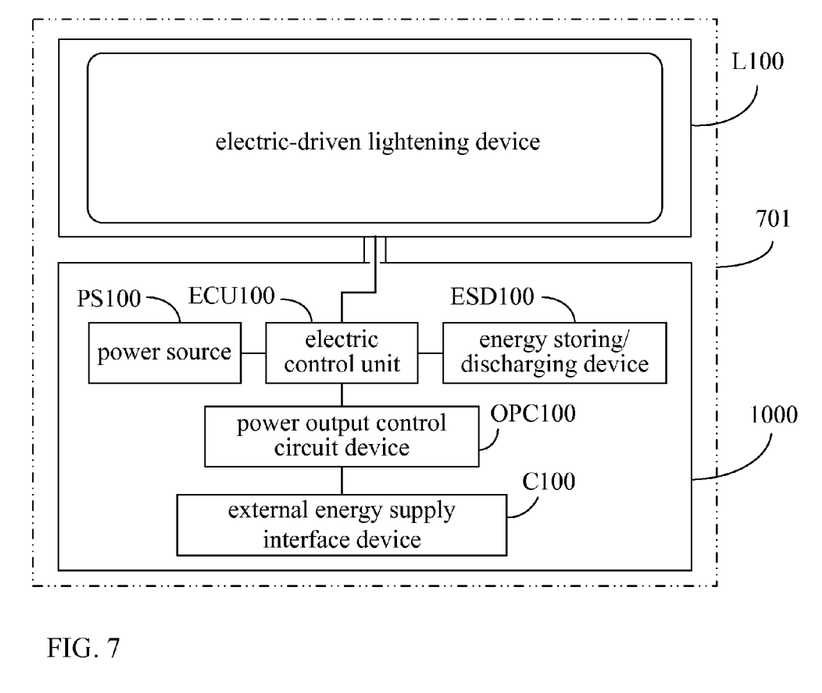
FIG. 7 is a schematic view illustrating the lighting device having uninterruptible illumination and external power supply function being applied in a blackout illumination device (701), according to one embodiment of the present invention.

FIG. 7 is a schematic view illustrating the lighting device having uninterruptible illumination and external power supply function being applied in a blackout illumination device (701), according to one embodiment of the present invention;

As shown in FIG. 7, the main configuration is that the power of the power source (PS100) outputs to the controller assembly (1000), then outputs AC and/or DC power to the external, and/or outputs to the electric-driven lighting device (L100);

wherein: the blackout illumination device (701) which is uninterruptable during electric blackout and composed by the electric-driven lighting device (L100) includes being applied in placed type or wall-hanged type illumination, and meanwhile provides AC and/or DC power which is uninterruptable during power blackout to the external.

Figure 8:
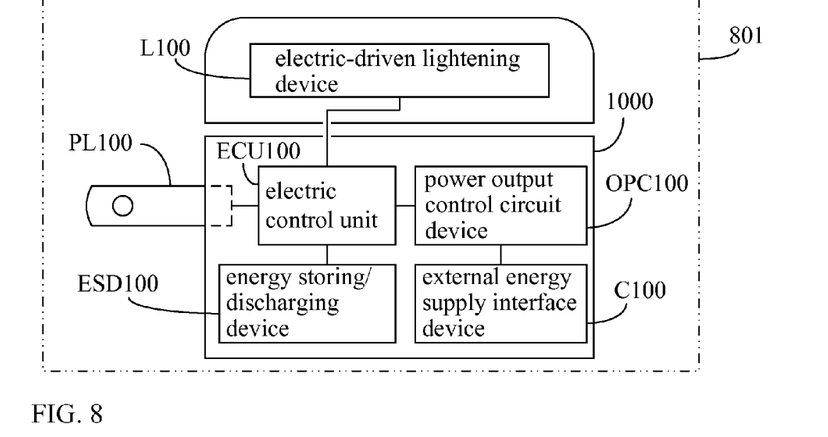
FIG. 8 is a schematic view illustrating the lighting device having uninterruptible illumination and external power supply function being applied in an uninterruptable wall-hanged lighting (801) having a plug (PL101) and installed on a wall surface, according to one embodiment of the present invention.

FIG. 8 is a schematic view illustrating the lighting device having uninterruptible illumination and external power supply function being applied in an uninterruptable wall-hanged lighting (801) having a plug (PL101) and installed on a wall surface, according to one embodiment of the present invention;

As shown in FIG. 8, the main configuration is that the power of the power source (PS100) outputs to the controller assembly (1000), then outputs AC and/or DC power to the external, and/or outputs to the electric-driven lighting device (L100);

wherein: the uninterruptable wall-hanged lighting (801) which is uninterruptable during electric blackout and composed by the electric-driven lighting device (L100) includes being applied in illumination installed on wall, and meanwhile provides AC and/or DC power which is uninterruptable during power blackout to the external.

Figure 9:
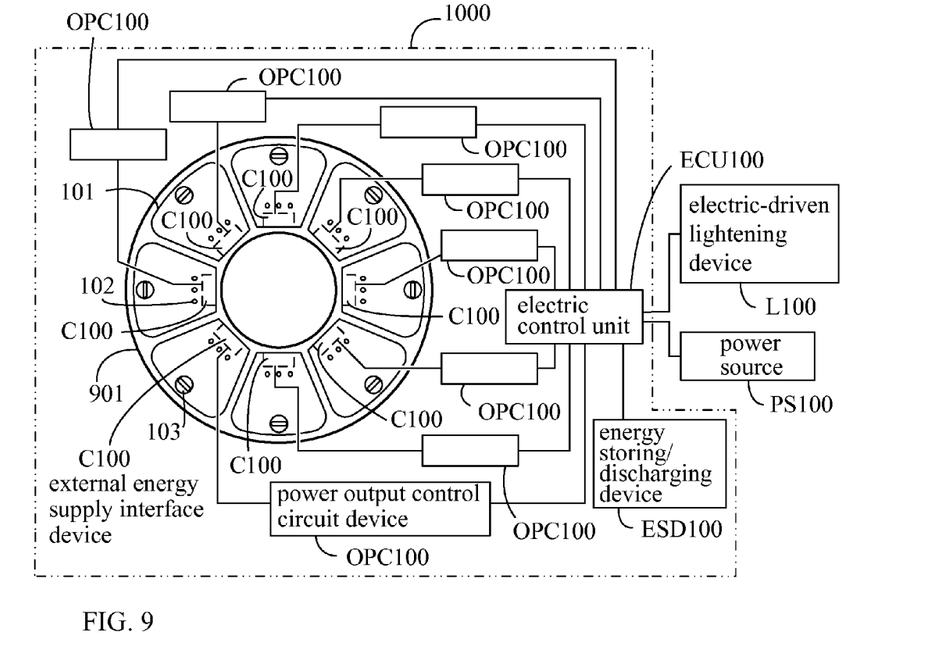
FIG. 9 is a schematic view illustrating the interface with external power supply function being installed with a cover locked type radially-arranged power supply case (901) according to one embodiment of the present invention.

FIG. 9 is a schematic view illustrating the interface with external power supply function being installed with a cover locked type radially-arranged power supply case (901) according to one embodiment of the present invention;

As shown in FIG. 9, the main configuration is that the power of the power source (PS100) outputs to the controller assembly (1000), then outputs AC and/or DC power to the external, and/or outputs to the electric-driven lighting device (L100);

wherein: the interface with external power supply function being installed with a cover locked type radially-arranged power supply case (901) can be further installed with a charging grid surface and optionally installed with a part or all of the following peripheral devices for management including a charging indication lamp, charging grid, charging grid protection cover (101), cover lock (103), wherein the charging grid protection cover (101) includes being sealed or formed with ventilation heat dissipating hole (102).

Figure 10:
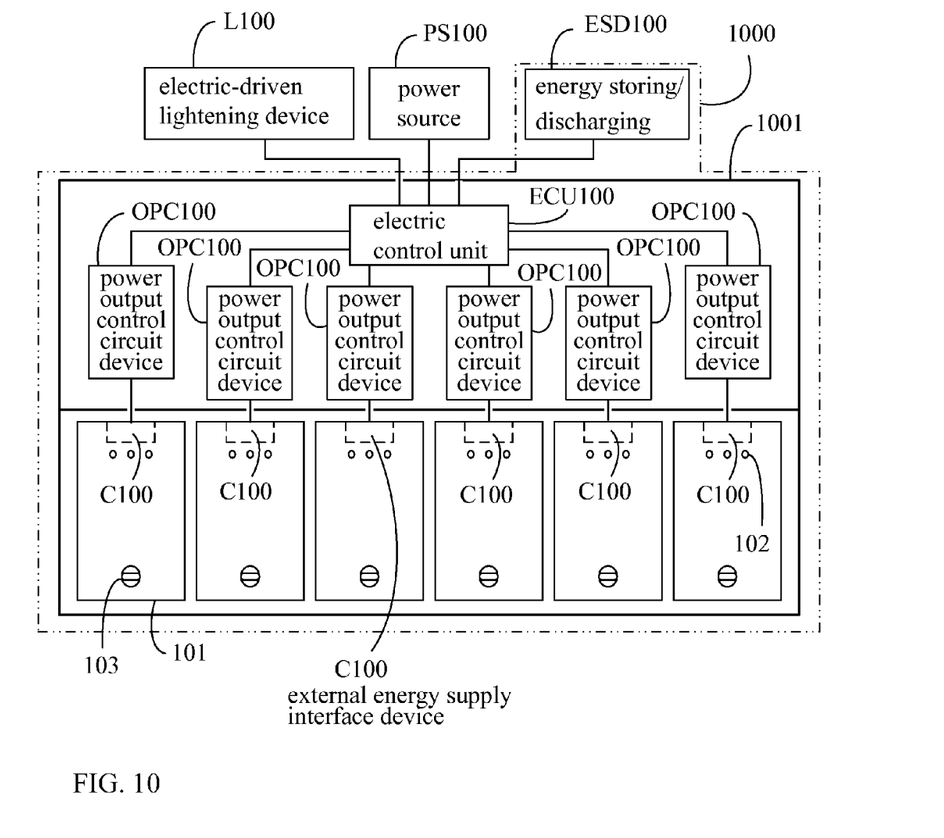
FIG. 10 is a schematic view illustrating the interface with external power supply function being installed with a cover locked type transversally-arranged power supply case (1001) according to another embodiment of the present invention.

FIG. 10 is a schematic view illustrating the interface with external power supply function being installed with a cover locked type transversally-arranged power supply case (1001) according to another embodiment of the present invention;

As shown in FIG. 10, the main configuration is that the power of the power source (PS100) outputs to the controller assembly (1000), then outputs AC and/or DC power to the external, and/or outputs to the electric-driven lighting device (L100);

wherein: the interface with external power supply function being installed with a cover locked type transversally-arranged power supply case (1001) can be further installed with a charging grid surface and optionally installed with a part or all of the following peripheral devices for management including a charging indication lamp, charging grid, the charging grid protection cover (101), the cover lock (103), wherein the charging grid protection cover (101) includes being sealed or formed with the ventilation heat dissipating hole (102).

The invention claimed is:

1. A lighting device having uninterruptible illumination and an external power supply function, in which the lighting device is combined with an energy storing/discharging device thereby providing an uninterruptible illumination function and supplying uninterruptable AC or DC power to the exterior during a power blackout; electric power supplied by at least one of a public power source (PS100) and the energy storing/discharging device is outputted to a controller assembly (1000) for controlling output of the AC or DC power, wherein the controller assembly (1000) inputs power from an AC, or DC, or AC converted to DC, or DC converted to AC power source (PS100) for outputting power to the electric control unit (ECU100), so as to control power for one or more of the following: (a) to charge the energy storing/discharging device (ESD100), (b) to supply power from at least one of the public power source (PS100) and the energy storing/discharging device to the electric-driven lighting device (L100), and (c) to output AC or DC power from at least one of the public power source (PS100) and the energy storing/discharging device to the exterior through a power output control circuit device (OPC100) and an external power supply interface device (C100), the lighting device comprising:

an operation device (OP100) constituted by at least one of manually-operated electromechanical switches, buttons, press keys, a touch-controlled or voice-controlled interface, an operation switch, a user identification device, and a command identification device, for actuating functions of the light device and supplying command signals to and controlling an electric control unit (ECU100);

the energy storing/discharging device (ESD100) constituted by a rechargeable energy storing device including a secondary battery capable of charging and discharging or a super capacitor or a capacitor, controlled by the electric control unit (ECU100) for controlling the electric power from the power source (PS100) used for charging the energy storing/discharging device (ESD100) through the electric control unit (ECU100), and controlled by the electric control unit (ECU100) for carrying out either or both of the following: (i) controlling output of electric power from the energy storing/discharging device (ESD100) for supplying power to the electric-driven lighting device (L100), and (ii) supplying power to the exterior through the power output control circuit device (OPC100) and the external power supply interface device (C100);

the electric control unit (ECU100): constituted by electromechanical components or solid electric circuit components or chips and corresponding software, for receiving the input power from the power source (PS100) and controlled by the operation device (OP100), to carry out one or more than one operational functions: (1) controlling the ON/OFF timing of the power supplied by the power source (PS100) for driving the electric-driven lighting device (L100); or (2) controlling the timing of charging the energy storing/discharging device (ESD100) or terminating the charging when saturated; or (3) through the energy storing/discharging device (ESD100), outputting electric power upon receipt by the electric control unit of a detection signal from the operation device (OP100) for controlling supply or termination of power to the power-driven lighting device (L100); or (4) controlled by the power output control circuit device (OPC100) to supply the AC public power with the voltage being regulated to the exterior through the external energy supply interface device (C100); or (5) through the setting of the electric control unit (ECU100) or controlled by the power output control circuit device (OPC100), converting the DC power of the energy storing/discharging (ESD100) into AC output power; or (6) directly outputting, or outputting through control of the power output control circuit device (OPC100), the DC power of the energy storing/discharging device (ESD100);

electric-driven lighting device (L100) including an electric-driven lamp, for illumination or for indication signal lighting, wherein when the power source (PS100) is terminated, the electric power of the energy storing/discharging device (ESD100) replaces the electric power of the power source (PS100) being supplied to the electric-driven lamp, the electric-driven lamp continuing operation according to the set operating state of the operation device (OP100) and the electric control unit (ECU100), and subsequently being controlled by the operation device (OP100) and operated by the set function through the electric control unit (ECU100); wherein when the power source (PS100) recovers to supply electric power, the electric power of the power source (PS100) replaces the electric power of the energy storing/discharging device (ESD100), the electric-driven lighting device (L100) is operated according to the set operating state of the operation device (OP100) and the electric control unit (ECU100), and is subsequently controlled by the operation device (OP100) and operated by the set function through the electric control unit (ECU100);

the external power supply interface device (C100) constituted by a plug or socket structure and a voltage and current controlling and protective device, through which the DC or AC power is input from the electric control unit (ECU100) and output to the power output control circuit device (OPC100) for output to the exterior such that when the power source (PS100) is terminated, power is supplied to the external power supply interface device (C100) from the energy storing/discharging device, and such that when the power source (PS100) recovers, power is supplied to the external power supply interface device (C100) from the power source (PS100); and power output control circuit device (OPC100) constituted by one or more of electromechanical components or electric circuit components, a fuse or break protection device, an electric power measuring device, a monitoring device for outputted voltage and current, and a wired or wireless detecting and monitoring device for the operation state at load end;

wherein the lighting device is further installed with a charging grid surface and at least one of the following peripheral devices for charging management: a charging indication lamp, a charging grid, a charging grid protection cover (101), and a cover lock (103), wherein the charging grid protection cover (101) includes being sealed or formed with a ventilation heat dissipating hole (102).

2. A lighting device having uninterruptible illumination and external power supply function as claimed in claim 1, wherein the electric-driven lighting device (L100) is a street lamp device (201) which is uninterruptable during an electric blackout and includes one of an illumination lamp or signal lamp, and meanwhile also outputs AC power, DC power, or AC and DC power during the power blackout.

3. A lighting device having uninterruptible illumination and external power supply function as claimed in claim 1, wherein the electric-driven lighting device (L100) is a public lighting device (401) which is uninterruptable during an electric blackout and includes illumination lighting or a high-altitude warning lamp, and meanwhile also outputs AC power, DC power, or AC and DC power during the power blackout.

4. A lighting device having uninterruptible illumination and external power supply function as claimed in claim 1, the electric-driven lighting device (L100) is a moveable lighting device (601) which is uninterruptable during an electric blackout and includes a moveable indoor or outdoor illumination function, and meanwhile also outputs AC power, DC power, or AC and DC power during the power blackout.

5. A lighting device having uninterruptible illumination and external power supply function as claimed in claim 1, the electric-driven lighting device (L100) is a blackout illumination device (701) which is uninterruptable during an electric blackout and meanwhile also outputs AC power, DC power, or AC and DC power during the power blackout.

6. A lighting device having uninterruptible illumination and external power supply function as claimed in claim 1, wherein the electric-driven lighting device (L100) is an uninterruptable wall-hanging lighting (801) which is uninterruptable during an electric blackout and installed on a wall, and meanwhile also outputs AC power, DC power, or AC and DC power during the power blackout.

7. A lighting device having uninterruptible illumination and external power supply function as claimed in claim 1, wherein the electric-driven lighting device (L100) is an interface with external power supply function installed with a cover locked radially-arranged power supply case (901).

8. A lighting device having uninterruptible illumination and external power supply function as claimed in claim 1, wherein the electric-driven lighting device (L100) is an interface with an external power supply function installed with a cover locked transversally-arranged power supply case (1001).

* * * * *